United States Patent [19]

Cassell

[11] Patent Number: 5,344,685
[45] Date of Patent: Sep. 6, 1994

[54] PRODUCTION OF COMPOSITE SANDWICH STRUCTURES

[75] Inventor: George Cassell, Huntington Beach, Calif.

[73] Assignee: McDonnell Douglas Corporation, Huntington Beach, Calif.

[21] Appl. No.: 24,340

[22] Filed: Mar. 1, 1993

[51] Int. Cl.$^5$ .......................... B32B 3/02; B32B 3/00; H01Q 1/42

[52] U.S. Cl. .......................... 428/66; 428/71; 428/304.4; 428/316.6; 343/872; 343/909; 425/403

[58] Field of Search ............... 343/872, 909; 425/403; 428/304.4, 316.6, 318.4, 319.1, 251, 64, 66, 163–167, 71, 119

[56] References Cited

U.S. PATENT DOCUMENTS

| | | | |
|---|---|---|---|
| 2,755,216 | 8/1952 | Lemons | 156/187 |
| 3,795,559 | 10/1971 | Horn et al. | 156/159 |
| 3,871,001 | 3/1975 | Myers | 343/872 |
| 4,620,890 | 11/1986 | Myers et al. | 156/196 |
| 4,917,945 | 4/1990 | Cattanach | 428/313.3 |
| 5,176,864 | 1/1993 | Bates et al. | 264/137 |

Primary Examiner—George F. Lesmes
Assistant Examiner—Blaine R. Copenheaver
Attorney, Agent, or Firm—John P. Scholl

[57] ABSTRACT

Contoured sandwich radomes and other composite structures having a core consisting of a series of flexible foam mandrels laid side-by-side, with inner and outer facings made up of a fabric impregnated with a resin system, capable of providing superior breakdown voltage characteristics when cured in one stage. Such structures are obtained by a process comprising laying a plurality of first plies of resin impregnated fabric in a contoured mold to form an outer facing, providing a plurality of narrow straight but flexible mandrels of plastic foam, laving individual groups of such foam mandrels in side-by-side relation onto the outer facing, one series of the foam mandrel groups positioned in a substantially transverse direction in the mold and another series of the foam mandrel groups positioned in a substantially longitudinal direction in the mold. The inner ends of the mandrel groups abut the sides of adjacent mandrel groups, to form a foam core. The mandrels which are essentially straight before being installed in the mold are kept from springing up from the mold contour by a restraining collar which the outer ends of the mandrels abut, the collar being removed after the mandrels have been pressured under vacuum. A plurality of second plies of resin impregnated fabric are laid over the foam core, and the plies of resin impregnated fabric are cured to form the inner and outer facings.

8 Claims, 4 Drawing Sheets

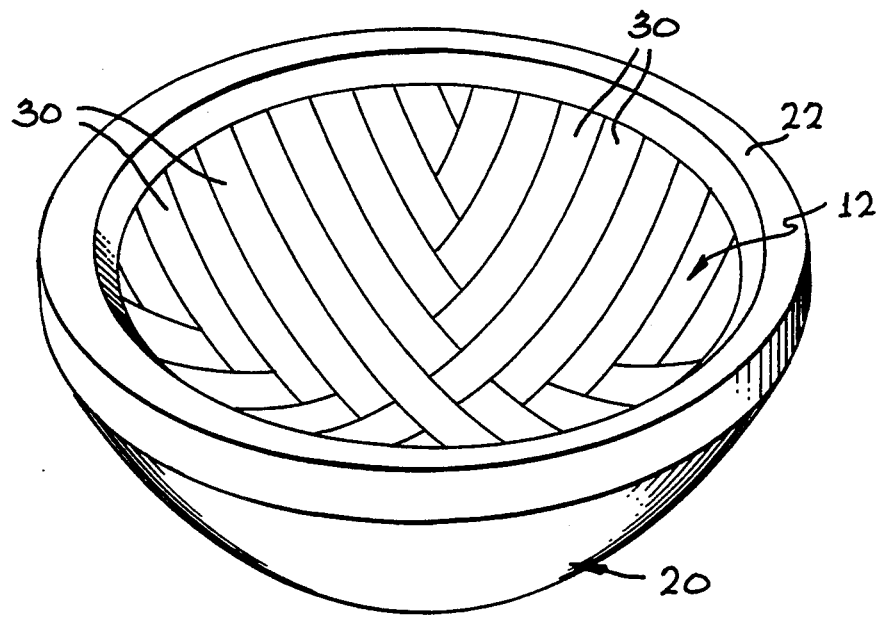
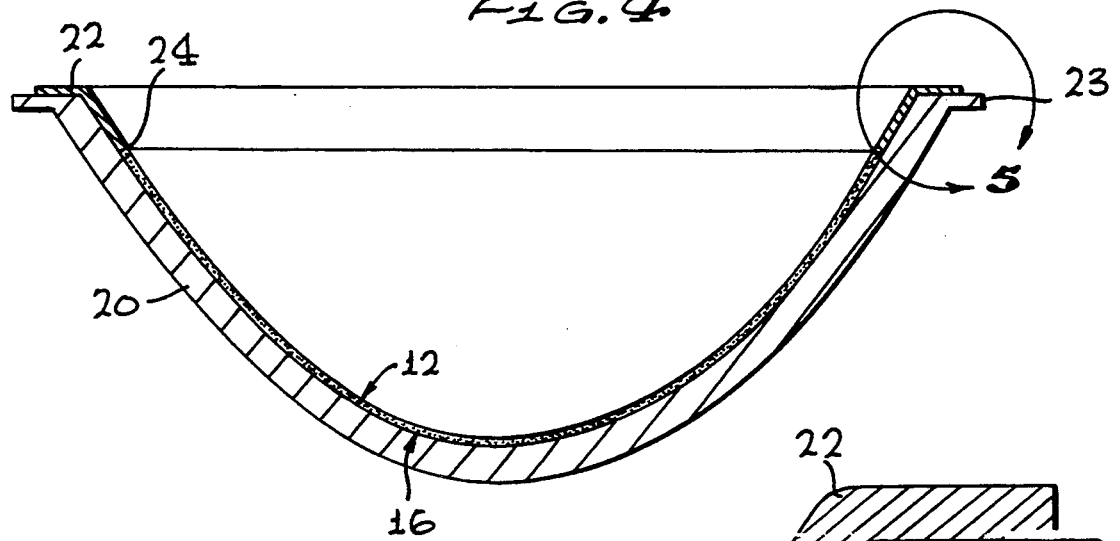
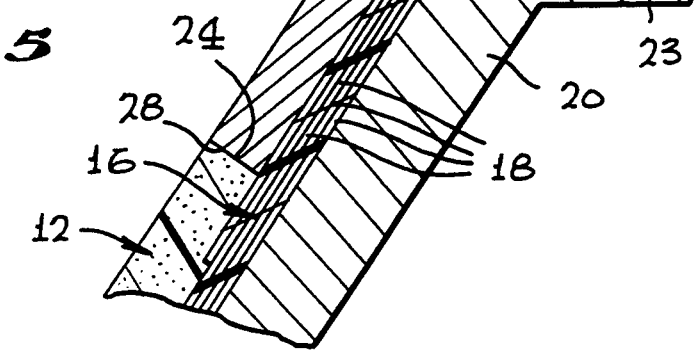

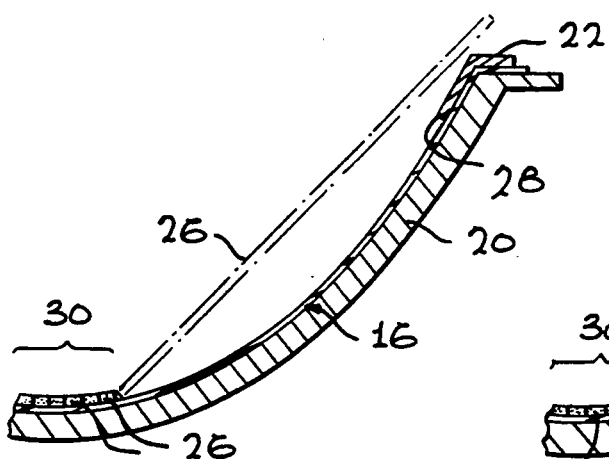
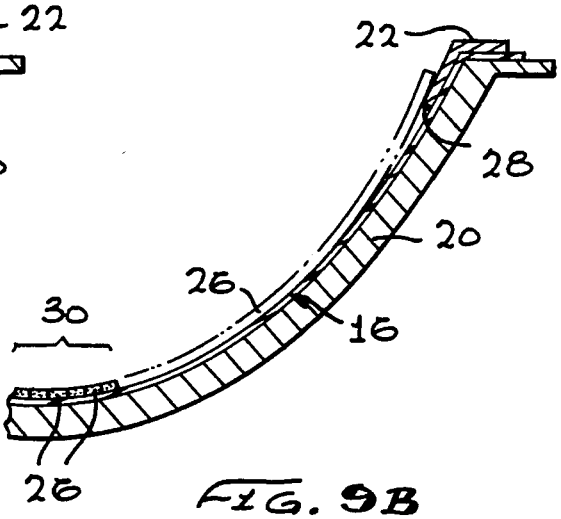
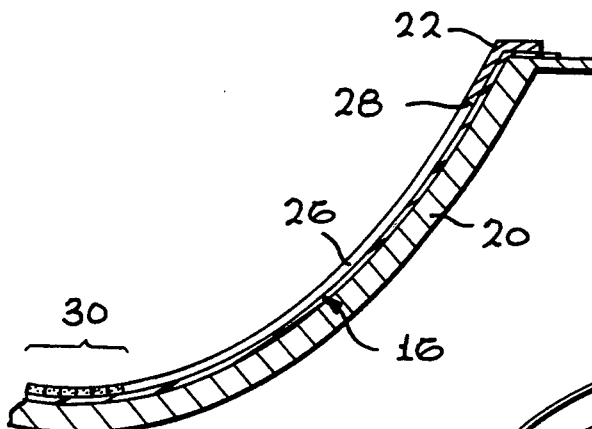
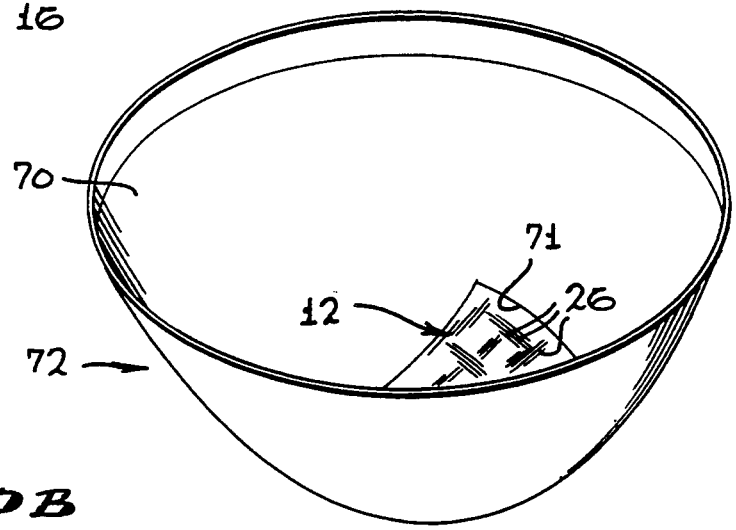
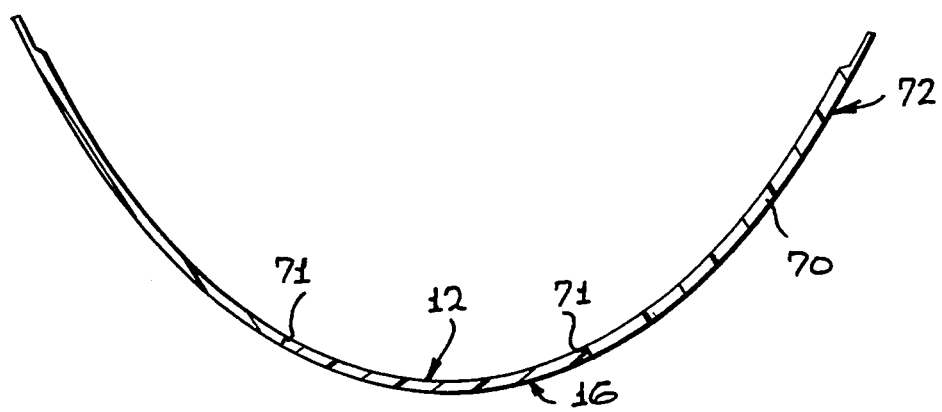

PRODUCTION OF COMPOSITE SANDWICH STRUCTURES

BACKGROUND OF THE INVENTION

This invention relates to composite sandwich structures, and particularly concerns the production of contoured sandwich radomes.

Enclosures for radiant electrical energy transmitting and receiving apparatus such as radar equipment are commonly referred to as radomes.

Nose radomes for transport jet aircraft are normally of sandwich construction. Most of these radomes incorporate a honeycomb core which is susceptible to impact damage and moisture ingestion. Moisture can enter the honeycomb through the damaged area or through pinholes created by electrostatic discharges or through the inherently porous facings associated with this construction. Water building up in the honeycomb cells will freeze and expand causing the damage to migrate. A layer of adhesive film is required for the honeycomb core radomes which increases cost of labor and material, and there is an inability to squeeze excess resin from the inside facing and precuring outside facing increases cost.

In U.S. Pat. No. 2,755,216 is disclosed the fluted core process for making radomes which utilizes wrapped wax mandrels, the wax being melted and drained from the radome after partial cure. The open flutes thus created allow any moisture that enters the core to be easily drained. These radomes have the disadvantages that they are contaminated with wax, are difficult to repair and do not have isotropic electrical and structural properties. Further, transmission performance does not meet new airline guidelines, dielectric breakdown voltage is poor and the cost is high.

With respect to existing foam core radomes, large sections of the foam are heat formed to shape in a tool prior to installing them in the mold against the outside facing, thus requiring extra tooling. Air and excess resin cannot be bled effectively from the outer facing through or around the large preformed foam sections. Heat forming the foam can cause thickness variations that are unacceptable electrically. Further, such radomes are difficult to repair in that each repair section must be heat formed, resulting in increased cost.

There is thus a need for a low cost light weight radome that will solve the above problems associated with honeycomb core, wax fluted core, and existing foam core radomes.

SUMMARY OF THE INVENTION

According to the invention, there is provided a method of fabricating composite sandwich structures including improved foam core radomes which includes the steps of laying a plurality of first plies of resin impregnated fabric in a contoured mold to form an outer facing. A plurality of straight relatively stiff narrow mandrels of plastic foam, particularly the foam hereinafter described, in the form of individual groups of such foam mandrels, are laid in side-by-side relation onto the outer facing, bending to the contour of the mold. In this process one series of such foam mandrel groups is positioned in side-by-side relation in one direction such as a transverse direction in the mold, and another series of such foam mandrel groups is positioned in side-by-side relation in another direction such as a longitudinal direction in the mold, to form a foam core.

During such positioning of the two series of foam mandrel groups, the inner ends of one series of foam mandrel groups abut the sides of the other series of foam mandrel groups, and the inner ends of such other series of foam mandrel groups abut the sides of the one series of foam mandrel groups. When laying up the two series of foam mandrel groups in the mold, in preferred practice a foam restraining collar is positioned around the outer periphery of the mold, and the outer ends of the foam mandrels in the groups of mandrels are wedged under the restraining collar to exert pressure at their inner ends against the abutted sides of other groups of mandrels, which keeps the mandrels tightly together and against the outer face plies.

Preferably, after the foam mandrels are positioned in the mold and the foam restraining collar is still in place, the assembly can be vacuum bagged to apply pressure to affix the core mandrel to the outer facing. Within a short period of time the vacuum pressure firmly affixes the foam mandrels to the uncured outer face plies.

A plurality of second plies of resin impregnated fabric is laid over the resulting foam core after the vacuum bag and collar have been removed, to form an inner facing. In some configurations it may be desirable to design the collar as a preformed detail that remains in the structure as a part of the attach flange.

The plies of resin impregnated fabric forming the outer and inner facings are then cured, as by vacuum bagging the assembly and applying a vacuum and heat.

The foam mandrels are sufficiently narrow in width to allow bleed off of air and excess resin through the spaces between adjacent mandrels during curing, and also sufficiently narrow in width to conform to the contour of the mold when pressurized. Even though the foam mandrels fit tightly together the open cells on the foam mandrel surface allow the air and excess resin from the outside facing to be evacuated. The open cells and voids between the mandrels fill with resin during this process which bonds the mandrels together.

The resulting product is an improved low cost composite sandwich or foam core radome structure in the form of a contoured shell which comprises inner and outer facings on such shell, each formed of glass fabric impregnated with a resin and a contoured foam core disposed between the inner and outer facings. The foam core is formed of a plurality of foam mandrels, one series of foam mandrels being positioned in side-by-side relation in a transverse direction in such shell, and another series of foam mandrels being positioned in side-by-side relation in a longitudinal direction in the shell, the form mandrels being sufficiently narrow in width to conform to the contour of the shell.

BRIEF DESCRIPTION OF THE DRAWINGS

FIG. 3 is a perspective plan view of the mold, showing the transverse and longitudinal arrangement of the foam mandrel groups over the outer resin impregnated fabric facing in the mold;

FIG. 4 is a cross section taken on line 4—4 of FIG. 2, showing the foam restraining collar in engagement with the outer ends of the foam mandrel groups and exerting pressure against the ends thereof;

FIG. 5 is an enlarged detail taken around line 5 of FIG. 4;

FIG. 9, including FIGS. 9A, 9B and 9C, illustrates how the foam mandrels are placed in the mold; and FIG. 10, including FIGS. 10A and 10B, illustrates how the invention method illustrated in FIG. 9 can be used for repairing, e.g. foam core, radomes.

DETAILED DESCRIPTION OF THE INVENTION AND PREFERRED EMBODIMENTS

Figure 1:
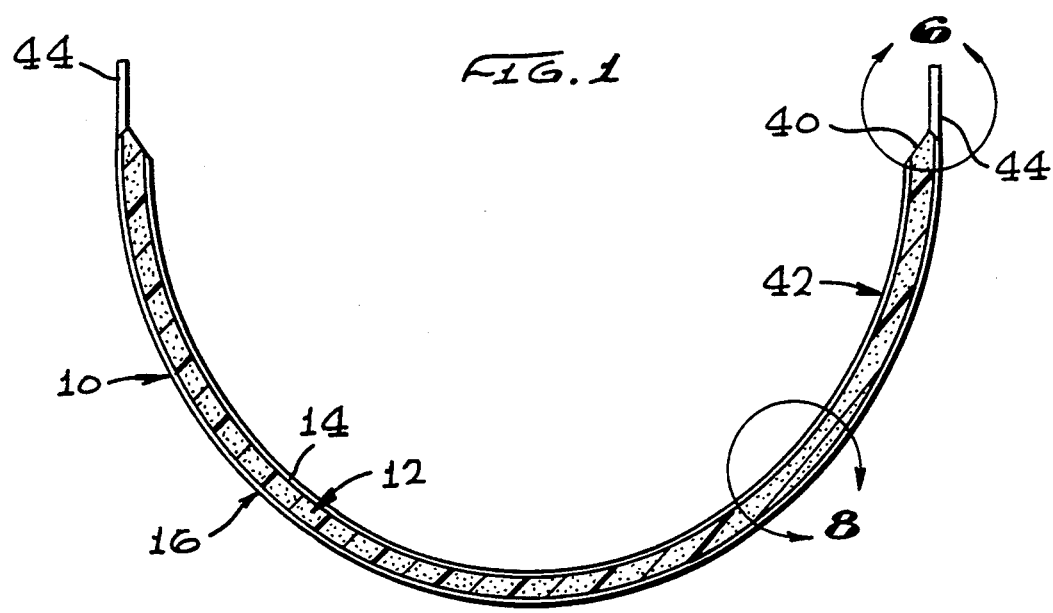
FIG. 1 is a cross-sectional view of a contoured foam core radome according to the invention.

Referring to FIG. 1 of the drawing, the foam core sandwich radome 10 of the invention is in the form of a dielectric composite sandwich of a uniquely designed foam core or foam core mandrel 12 disposed between an inner facing 14 and an outer facing 16, both facings attached to the foam core and constructed of a resin impregnated fabric such as resin impregnated glass cloth.

Referring to FIGS. 2 to 5, illustrating the procedure for constructing and attaching the foam core mandrel 12 to the outer facing 16, multiple plies of resin impregnated fabric 18 are laid into a high temperature curved mold or tool 20, preferably female, to form the outer mold side facing 16. The fabric is normally a glass cloth (fiberglass) pre-impregnated with a resin such as a B-stage epoxy resin. A preferred material is Fiberite MXB 7704 or MXB 7711 pre-preg, which consists of an epoxy resin impregnated in 181 type E-glass cloth, and having a thickness of 0.010 inch per ply. However, other fibers and resins such as quartz cloth and polyester resin can be employed. The preferred configuration of the outer facing 16 is made up of 3 or 4 layers or plies of resin impregnated glass cloth. However, 1 to 6 layers of the pre-preg can be used for various parts as dictated by the structural and electrical requirements, with additional layers employed functioning as doubler plies for added strength.

Referring to FIGS. 4 and 5, after the outside face plies 18 are positioned in the mold or tool 20, a tooling assembly in the form of a restraining collar or holding tool 22 is mounted on the flange 23 of the mold 20. The collar fits snugly down around the upper ends of the outer face plies 18 and extends down to the trim line 24 of the foam. The collar is secured in place by pins or weights (not shown).

The foam used for the foam core mandrel 12 is normally obtained from the vendor cut in sheets to the required thickness, the foam being rigid in block form. The foam sheets are then cut into long thin narrow foam mandrels, illustrated at 26 in FIGS. 2 and 9. At this point the narrow mandrels are straight and stiff but flexible along their length. The preferred mandrel for fabricating an X-band radome (most radomes house radar antennas that operate at X-band frequencies) is the material marketed as Divinycell foam by Barracuda Technologies. Such foam is understood to be a polymeric alloy of cross-linked aromatic polyamide-urea and linear vinyl polymer. The exact thickness of the foam is determined by the electrical properties (dielectric constant and loss tangent) of the foam, the shape of the radome, the frequency and polarization of the antenna housed within the radome, the thickness of the facings and the structural loads. The core thickness is normally in the range between 0.1 and 0.5 inch.

Figure 5A:
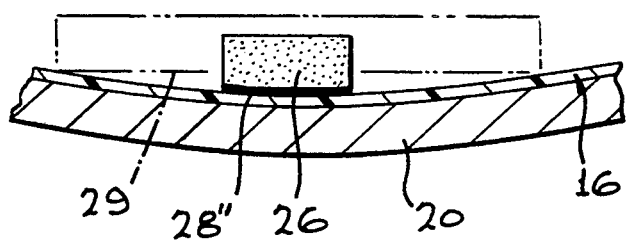
FIG. 5a illustrates a detail concerning the narrow width of each foam mandrel in relation to the radius of curvature of the tool.

The width of the individual foam mandrels 26 is selected to be sufficiently narrow so the foam can fully seat down against the outer facing 16 in the curved tool 20 when the part is cured under elevated temperature and pressure, as illustrated at 28" in FIG. 5a. Wide foam mandrels which do not fully seat down on the outer facing 16, as illustrated in dotted lines 29 in FIG. 5a would be unacceptable. The foam mandrel width is also selected to assure that the butt joints 64 (see FIG. 8) between the mandrels are close enough together that the mandrels 26 can force the excess resin and air from the outer facing 16 up through these joints during curing, as noted hereinafter. The width of the foam mandrels 26 can range from about 0.2 to about 0.75 inch. An illustrative Divinycell foam mandrel 26 can be about 0.250 inch thick and 0.330 inch wide. The preferred width of 0.330 inch is satisfactory for radii of curvature as small as 4 inches. Radomes of double curvature with smaller radii may require a narrower mandrel. Foam mandrels up to about ¾ inch in width can be used if the tool radii are larger than 8 inches and no significant bending of the mandrel is required in the mandrels width dimension.

The foam density can range from about 4 to about 7 lb./ft$^3$, the preferred density being $7 \pm 1$ lb./ft$^3$. This is the ideal density to prevent excessive compression of the foam during the cure cycle. This foam will compress about 8% if the full cure pressure (14 psi) and cure temperature (250° F.) are used. This density also provides the necessary support of the facings when the radome is subjected to rain, hail and rock impact as well as the normal structural loads. For those cases where the parts are subjected to lesser loads and lower cure temperatures and pressures, then a core density as low as 4 pounds per cubic ft. can be used.

Figure 2:
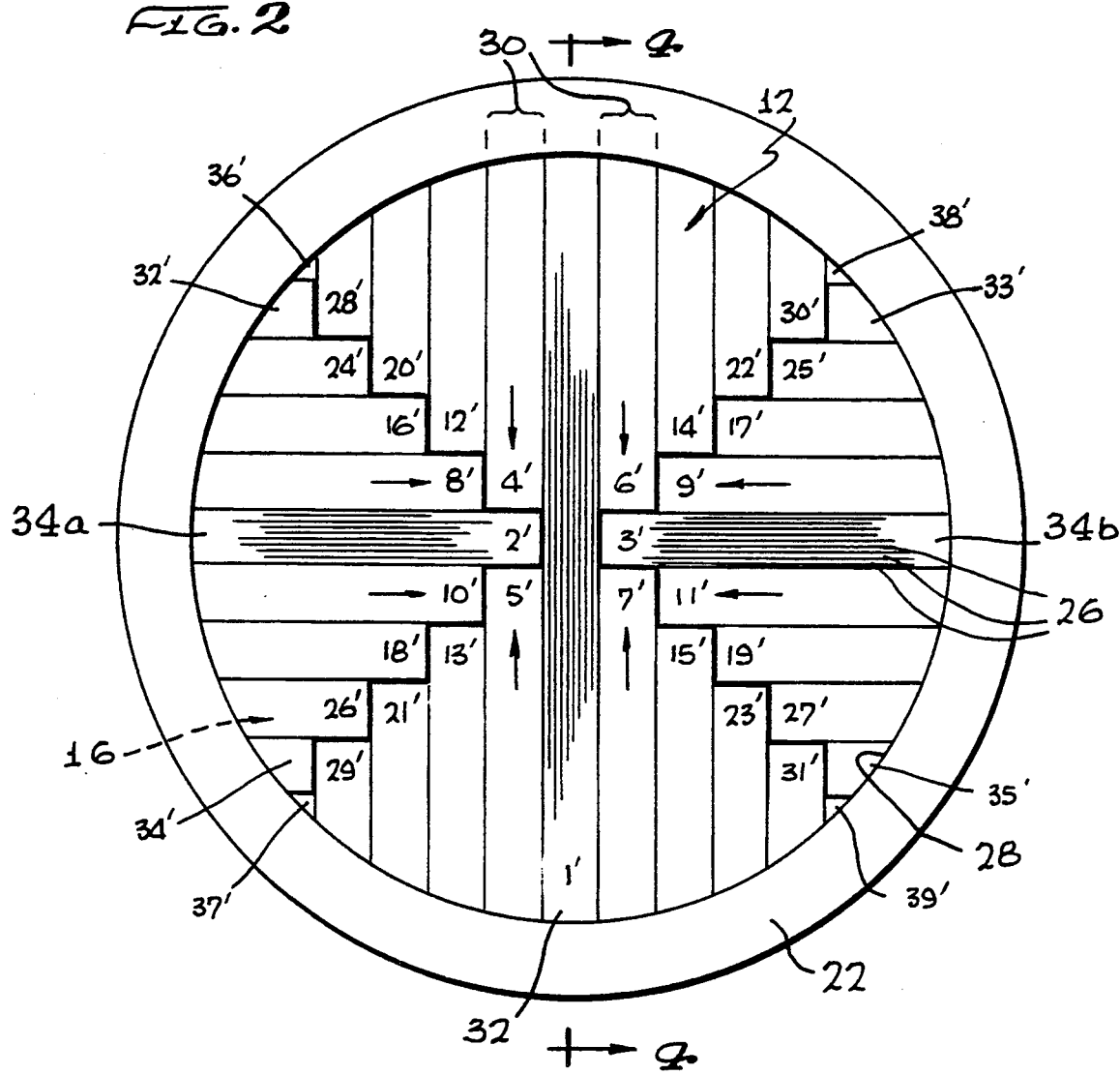
FIG. 2 is a plan view of the mold for producing the invention radome, showing schematically the placement of the respective foam mandrel groups with ends and sides in abutting engagement to form the foam core.
Figure 8:
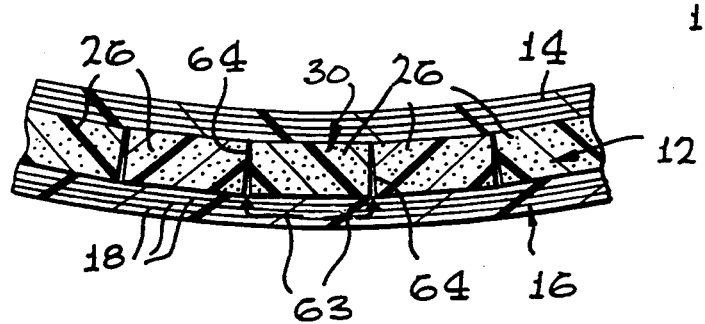
FIG. 8 is an enlarged detail taken around line 8 of FIG. 1, illustrating the provision of spaces between adjacent narrow foam mandrels which permits excess resin and air to be evacuated from the outer facing during curing.

In the preferred configuration the foam mandrels 26 in FIGS. 2 and 8 are laid down onto the outer facing 16 formed by the plies of resin impregnated cloth 18 in a pattern as illustrated in FIG. 2, with the outer ends of foam mandrels 26 abutting the lower edge 28 of collar 22. Thus, the relatively stiff mandrels having flexibility along their length are bent to conform to the tool curvature and if not restrained by the collar will spring up off the surface. The narrow mandrels 26 are laid up preferably in mandrel groups 30, each made up of a plurality, e.g. 10 to 12 mandrels 26, in close contact with each other. The initial group 32 of foam mandrel groups 30 are placed in side-by-side relation in a substantially logitudinal direction and extend on the surface from one side of the mold to the other on the facing 16, and the second groups 34a and 34b of foam mandrel groups 30 are positioned in side-by-side relation in a substantially transverse direction on facing 16 in the mold.

FIG. 9, including FIGS. 9A, 9B and 9C, illustrates how the foam mandrels are placed in the mold. FIG. 9A shows the initial placement of a straight foam mandrel 26, shown in dotted lines, with its lower edge positioned against the side of the adjacent foam mandrels 26 of a foam mandrel group 30. FIG. 9B shows how the mandrels 26 are butted against the sides of adjacent mandrel group 30 and trimmed slightly long, and FIG. 9C illustrates how the ends of mandrels 26 are wedged under the restraining collar 22. Without the restraining collar the relatively stiff mandrels which have been flexed to fit the contour of the mold will spring loose from the mild tack of the uncured outer face plies.

It is important that when a group of mandrels 34a abuts another group of mandrels 32 that the group of mandrels 34b abutting the opposite side and exerting an opposite force be installed simultaneously. This keeps the groups of mandrels squeezed tightly together and also keeps them from being pushed out of position. A normal sequence of installing the primed groups of mandrels 30 is specified by the numbers FIG. 2, and progressing from numerals 1' to 39'.

Thus, it is seen that one series of foam mandrel groups 30 is positioned in one direction such as a transverse direction on the outer facing 16 in the mold, and another series of such foam mandrel groups 30 is positioned in side-by-side relation in another direction such as a longitudinal direction, to form the foam core 12. It is also noted that the inner ends of such one series of mandrel groups abut the sides of such another series of mandrel groups, and vice versa, and that the adjacent mandrel groups in a substantially transverse direction are successively shorter in length and the adjacent mandrel groups in a substantially longitudinal direction are also successively shorter in length.

The above described pattern of laying up the foam mandrel groups 30 in a substantially transverse and a substantially longitudinal pattern has several advantages over the patterns that are essentially parallel or circular. One advantage of the present configuration is that the mandrels require only modest bending in their widest dimension where they are more stiff. The other advantage is that the foam mandrels 26 can be cut slightly long and wedged under the restraining collar 22 to exert pressure against the sides of the other mandrels in the direction of the arrows in FIG. 2, forcing the mandrels into a tight pattern.

FIG. 10, including FIGS. 10A and 10B, illustrates how the above method of the invention for fabricating a radome core can be employed for repairing foam, honeycomb or fluted core radomes, such as 72. In this case a cleanly cut hole is provided at 71 to remove the damaged core and the outer facing 16 and foam core structure 12 containing foam mandrels 26 of the invention, is inserted into the hole, with the restraint at the outer ends of the foam mandrels such as 26 provided by the undamaged sandwich structure 70 around the perimeter. Thereafter, an inner facing (not shown) similar to inner facing 14 is applied over foam core 12 in the manner described above.

After all the foam mandrel groups 30 have been fitted snugly together in the mold as illustrated in FIG. 2, forming the foam core 12, a vacuum bag (not shown) is applied over the assembly illustrated in FIGS. 3, 4 and 5, and vacuum is applied to pressurize the foam mandrels 26 foam core 12, and make them adhere tightly to the face plies 18 of outer facing 16.

After removing the vacuum bag, the restraining collar 22 is removed and a piece of foam of triangular cross section 39 of the same composition as foam mandrels 26 is placed around the outer periphery 38 (see FIG. 6) of the completed foam core 12. This triangular piece of foam provides the structural transition or taper at 40 required between the thick sandwich portion 42 and the solid laminate attach flange 44. The foam transition can also be made by chamfering the edges of the foam core 12 to provide the same transition geometry as 39 but requires a longer mandrel and hence a shallower collar.

Figure 6:
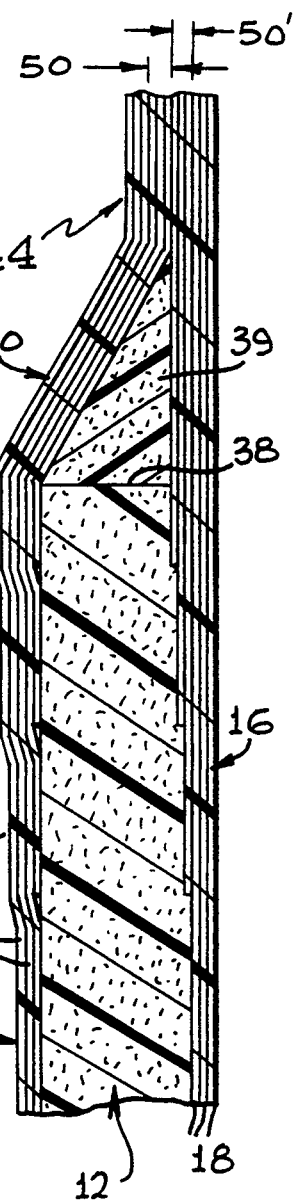
FIG. 6 is an enlarged detail taken around line 6 of FIG. 1, showing the transition of the foam core to the attach flange.

Next, the inner facing 14 is laid up on the foam mandrels 26 forming the foam mandrel groups 30. As in the case of the outer facing 16, formed of plies 18, for this purpose, as seen in FIG. 6, multiple plies of pre-preg, i.e., resin impregnated fabric 48 such as glass cloth impregnated with a B-stage epoxy resin, are laid up on the foam core mandrel 12. Thus, for example, 3 or 4 such plies can be employed. At the outer areas of the core mandrel, and adjacent to the transition 40, doubler plies 50 of the same material as plies 18 and 48, are applied to the inner facing 14 adjacent transition 40. Similar doubler plies 50' are preferably also previously applied to the outer facing 16 adjacent the transition 40. All of the plies 18, 48, 50 and 50' extend over the transition 40 and are then bonded together to form the attach flange or band 44.

After the fiberglass layup as illustrated in FIG. 6 has been completed, according to one mode of procedure a release fabric (not shown) is installed over the inner facing 14 followed by a bleeder cloth (not shown), and the arrangement is then vacuum bagged and the pre-preg inner and outer facings 14 and 16 are cured in conventional manner, e.g. at a pressure of 12 to 14 psi and a temperature of 240° to 250° F. for two hours, for glass cloth-epoxy pre-pregs. After the assembly has cooled, the vacuum bag and bleeder system can be peeled off, and the completed radome shell 10 as seen in FIG. 1 obtained.

Figure 7:
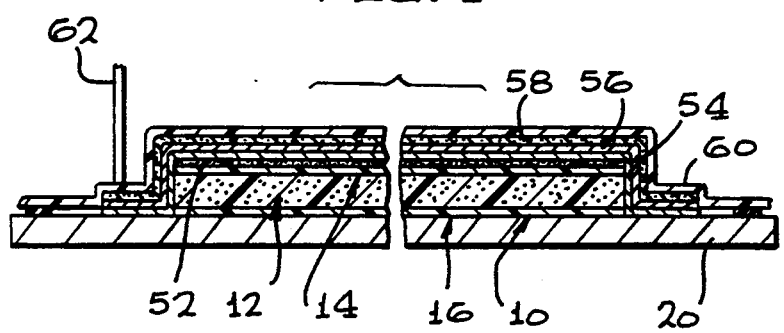
FIG. 7 illustrates one form of vacuum bagging arrangements for curing the composite sandwich arrangement of inner and outer facings of resin impregnated fabric with foam core therebetween.

FIG. 7 illustrates schematically a preferred arrangement for vacuum bagging and curing the assembly of FIG. 6. A permeable release or parting fabric 52 is applied over the inner facing 14 of the assembly on tool 20. Release fabric 52 can be a breathable Teflon coated glass fabric. Over the release fabric 52 is applied a bleeder cloth 54 such as dry woven glass fabric. A non-porous separator film 56 such as nylon is next applied over the bleeder material 54. A breather material layer 58 such as glass fiber cloth is placed over the non-porous separator film 56. A vacuum bag 60 is then placed over the entire assembly.

A vacuum is drawn through vacuum hose 62 and the tool 20 is heated. The vacuum pressure forces the vacuum bag down on the assembly. Excess resin and air are forced up from the plies of the outer facing 16 along paths 63 (see FIG. 8) through the spaces formed at the butt joints 64 between the narrow foam mandrels 26 of foam mandrel groups 30 and are bled, together with excess resin and air, from the plies of the inner facing 14, from the mandrel assembly through release fabric 52 into bleeder cloth 54. If paths 63 are longer than about 0.37 inch, air and excess resin is left in the outer facing 16. This is one of the reasons for preferably limiting foam mandrel width to a maximum of 0.75 inch. The breather cloth 58 provides a uniform vacuum pressure and compaction across the assembly. Some resin is retained in the spaces of the butt joints 64 between the narrow mandrels 26 which upon curing bonds the mandrels together. The above procedure results in a lighter weight higher quality laminate of foam core and inner and outer facings, particularly suitable as a radome.

From the foregoing, it is seen that the invention provides an improved dielectric composite sandwich or radome having inner and outer facings made up of glass fabric impregnated with resin and capable of providing superior breakdown voltage characteristics when cured in one stage with a series of foam mandrels, the foam mandrels being narrow enough in width to allow good bleed off of air and excess resin from between mandrels, and narrow enough in width to conform to the contour of the mold in the transverse as well as longitudinal direction when pressurized. The foam mandrels fit tightly enough together that they will apply uniform pressure on the facings and will be bonded together by the excess resin bled from the outer facing, and the foam mandrels will not compress excessively at the elevated temperatures and pressure during the cure cycle.

The novel features of the invention include the following:

The radome shell is fabricated in a single stage and both the inner and outer facings are automatically sealed in the process. The tight fit of the foam mandrels attributable to the longitudinal-transverse pattern and the restraining collar coupled with the ability of the process to bleed air and excess resin from the inner and outer facings and to bond the foam mandrels into one large foam core section provides an electrically and structurally isotropic wall with low porosity facings. This type construction is inherently moisture resistant and should prevent static burn holes (caused by triboelectric charging of the aircraft) and will allow lightning protection strips to be spaced further apart on the radome. It is the least expensive method of fabricating a radome both from a labor and material standpoint. Since the facings are essentially non-porous the surface preparation for paint is simplified. Reduced surface filler means better electrical performance and longer life for the rain erosion protection coatings. It is the easiest type radome to repair, and has longer life because of high moisture resistance. The core is cold formed to the mold contour as it is installed in the mold, and does not require heat forming, preforming, machining to contour or special tooling. The narrow foam mandrels provide a method of pressurizing the laminate and bleeding excess resin and air from the inside and outside facings.

Since various changes and modifications of the invention will occur to those skilled in the art within the spirit of the invention, the invention is not to be taken as limited except by the scope of the appended claims.

What is claimed is:

1. A foam core radome structure in the form of a contoured shell which comprises
   inner and outer facings on said shell, each formed of glass fabric impregnated with a resin and
   a contoured foam core disposed between said inner and outer facings, said foam core formed of a plurality of foam mandrel groups, each comprised of a multiplicity of straight relatively stiff narrow foam mandrels, one series of said foam mandrel groups being positioned in side-by-side relation in a substantially transverse direction in said shell, and another series of said foam mandrel groups being positioned in side-by-side relation in a substantially longitudinal direction in said shell, said foam mandrels being sufficiently narrow in width so as to conform to the contour of the shell.

2. The structure of claim 1, the adjacent foam mandrel groups in said one series of foam mandrels being in tightly fitting side-by-side relation, and the adjacent foam mandrel groups in said another series of mandrels being in tightly fitting side-by-side relation.

3. The structure of claim 2, wherein the adjacent mandrel groups in a substantially transverse direction are successively shorter in length and the adjacent mandrel groups in a substantially longitudinal direction are also successively shorter in length, the mandrel groups being applied with the inner ends of one mandrel group in a substantially longitudinal direction abutting the side of a mandrel group in a substantially transverse direction and the inner ends of a mandrel group in a substantially transverse direction abutting the side of a mandrel group in a substantially longitudinal direction.

4. The structure of claim 1, the adjacent foam mandrels of the foam mandrel groups being bonded together cured resin in the interfaces between the mandrels.

5. The structure of claim 1, said inner and outer facings each being formed of a plurality of plies of glass fabric impregnated with an epoxy resin.

6. The structure of claim 1, said foam core being formed of a polymeric alloy of cross-linked aromatic polyamide-urea and linear vinyl polymer, the density of said foam being about $7\pm1$ lb/ft$^3$.

7. The structure of claim 1, said foam mandrels having a thickness ranging from about 0.1 to about 0.5 inch and a width ranging from about 0.2 to about 0.75 inch.

8. A foam core radome structure in the form of a contoured shell which comprises
   inner and outer facings on said shell, each formed of glass fabric impregnated with a resin,
   a contoured form core disposed between said inner and outer facings, said foam core formed of a plurality of foam mandrel groups, each comprised of a multiplicity of straight relatively stiff narrow foam mandrels, one series of said form mandrel groups being positioned in side-by-side relation in a substantially transverse direction in said shell, and another series of said foam mandrel groups being positioned in side-by-side relation in a substantially longitudinal direction in said shell, said foam mandrels being sufficiently narrow in width so as to conform to the contour of the shell, and
   a triangular piece of foam around the outer periphery of said foam core to form a transition, said inner facing and said outer facing extending over said transition to form an attach flange for said radome structure.

* * * * *